United States Patent [19]

van Linden et al.

[11] Patent Number: 4,565,572
[45] Date of Patent: Jan. 21, 1986

[54] PROCESS FOR RECOVERING METAL FROM ALUMINUM DROSS

[75] Inventors: Jan H. L. van Linden, Allison Park, Pa.; James S. Whitehead, Newburgh, Ind.

[73] Assignee: Aluminum Company of America, Pittsburgh, Pa.

[21] Appl. No.: 676,435

[22] Filed: Nov. 29, 1984

[51] Int. Cl.[4] ............................................. C22B 21/00
[52] U.S. Cl. ....................................... 75/24; 75/68 R
[58] Field of Search .................. 75/24, 68 R; 210/774

[56] References Cited

U.S. PATENT DOCUMENTS

| 4,057,232 | 11/1977 | Ross et al. | 266/227 |
| 4,191,559 | 3/1980 | van Linden et al. | 75/68 R |
| 4,286,985 | 9/1981 | van Linden et al. | 75/65 R |
| 4,386,956 | 6/1983 | Roth et al. | 75/24 |

FOREIGN PATENT DOCUMENTS 8403719  9/1984  European Pat. Off. .

Primary Examiner—Melvyn J. Andrews
Attorney, Agent, or Firm—Brian D. Smith

[57] ABSTRACT

A method for the recovery of free aluminum metal from its dross is disclosed. The dross is charged into a receptacle having at least one inclined sidewall and at least one passageway extending through the receptacle's bottom. The passageway is sized and configured to permit the passage of free aluminum metal but inhibit the passage of the dross' network of solid particles. Dross having been charged into the receptacle is then mechanically compacted by applying compressive forces on the dross towards the inclined sidewall. Such compression causes the free aluminum in the dross to coalesce and pass through the passageway in the receptacle's bottom. Steps are also taken during the aforesaid charging and compaction steps to prevent or inhibit the dross from cooling. Free aluminum passing through the receptacle's bottom passageway is then collected. Compacted dross remaining in the receptacle can be subjected to conventional reprocessing techniques for recovering remaining aluminum contained therein.

16 Claims, 4 Drawing Figures

4,565,572

PROCESS FOR RECOVERING METAL FROM ALUMINUM DROSS

BACKGROUND OF THE INVENTION

The invention generally relates to the recovery of aluminum from secondary sources. More specifically, the invention relates to a method for the recovery of aluminum from aluminum dross which forms on the surface of the molten aluminum during aluminum melting operations.

Dross typically contains for 30 to 90% free molten aluminum, depending on the particular processing technique and type of furnace. The remainder consists of a sponge-like network of solid particles containing aluminum oxide and various other oxides, nitrates and carbides which form during the melting operation by reacting with the ambient atmosphere. This network of solid particles is referred to herein as the solids network.

The recovery of aluminum from secondary sources, such as dross, is desirable because the production of aluminum from its primary source, bauxite, is extremely expensive due to the high energy costs involved. Moreover, with energy costs increasing almost daily, such production from secondary sources is becoming even more desirable.

U.S. Pat. No. 4,386,956 to Roth et al. discloses a method and apparatus for recovering aluminum from aluminum dross. The apparatus includes a special tray comprising multiple parallel troughs which is positioned adjacent an aluminum melting or holding furnace to collect dross from the furnace. Upon withdrawal of dross from the furnace and collection thereof in the tray, aluminum begins to flow through openings provided in each trough and into a collection pan. As soon as the troughs are filled with dross, the dross is compressed. Such compression causes additional aluminum metal to flow from the dross through openings in the tray and into the collection pan. During the compression operation, the dross is quickly cooled to diminish thermite or oxidation reactions. Compression also causes small droplets of aluminum dispersed throughout the dross to coalesce into large plates at the surface of the dross. The cooled dross material is then typically screened and subjected to other processing techniques to recover aluminum metal remaining in the dross. Compression is provided with a ram which serves as both a heat sink and means to restrict access of oxygen to the aluminum in the dross. The ram is wedge shaped, and it cooperates with a complementary wedge-shaped trough to compress the dross in the trough and force the free aluminum in the dross through the trough openings and into the collection pan. To supplement the cooling effect of the wedge-shaped ram members, Roth discloses that a coolant, generally water, may be circulated through passages or tubes provided in the wedge-shaped ram members.

An apparatus similar to that disclosed in Roth is disclosed in U.S. Pat. No. 4,057,232 to Ross et al. which discloses a method and apparatus for separating molten zinc from dross. The apparatus includes a dross press comprising a source of power, ram means arranged to be driven from the source, a ladle means having a perforated wall adapted to contain the dross to be pressed, support means for said ram and ladle means, a drive shaft for the ram connected to the source of power, a ram head connected to the drive shaft having a downwardly facing convex external surface which is aligned for concentric interfitting relationship with the ladle means wall which has an upwardly facing concave internal surface complementary in shape to the convex surface of the ram head.

In operation Ross' ram head is forcibly driven into a mass of dross in the ladle to work the mass to coalesce the vestiges of molten metal in the dross to form droplets and force such through the perforations in the wall in a manner similar to that disclosed in Roth for separating aluminum from its dross.

While the processes disclosed in Roth and Ross ostensibly work as intended, there is always a need for processes which operate more efficiently and obtain greater yields.

Accordingly, an object of the present invention is to provide an improved method and press for the recovery of aluminum from aluminum dross.

Another object of the present invention is to provide a method for the recovery of aluminum from aluminum dross which facilitates the up-front recovery of increased amounts of free aluminum from the dross during the compression step, thereby in many cases obviating the need for subsequent, more expensive processes to recover the aluminum remaining in the compacted dross.

Yet another object of the present invention is to provide a more economical process for recovering aluminum from aluminum dross.

Another object of the present invention is to provide a method for recovering aluminum from aluminum dross having high production rates.

These and other objects will become apparent from the drawings, specification and claims appended hereto.

SUMMARY OF THE INVENTION

In accordance with these objects, there is disclosed a method for the recovery of free aluminum metal from hot aluminum dross which forms on the surface of molten aluminum during aluminum melting operations. The hot dross is skimmed from the melting operation and charged into a receptacle having at least one inclined sidewall and at least one passageway extending through the receptacle's bottom. The passageway is sized and configured to permit passage of free aluminum metal but inhibit passage of the dross' network of solid particles (hereinafter referred to as "solids network"). After a suitable amount of dross has been charged into the receptacle, the dross is mechanically compacted by preferably applying a series of compressive strokes on the dross towards the inclined sidewall. Such compression causes a substantial portion of the free aluminum in the dross to separate therefrom and pass through the passageway provided in the bottom of the receptacle. To enhance aluminum recovery from the hot dross, steps are taken to prevent or inhibit the hot dross from cooling during the aforesaid charging and mechanical compaction steps. The aluminum which passes through the passageway provided in the bottom of the receptacle is then collected and either immediately returned to the melting operation or cooled in a convenient form for later use as pig. The compacted dross remaining in the receptacle is then typically discharged from the receptacle and disposed of or, if desired, subjected to conventional reprocessing techniques for recovering any remaining aluminum.

In accordance with these objects, there is disclosed a power driven press for recovering aluminum from aluminum dross which forms on the surface of molten aluminum during aluminum melting operations. The press is provided with a receptacle for containing dross which has been skimmed from the surface of molten aluminum. The receptacle has at least one inclined sidewall and at least one passageway extending through its bottom. The passageway is sized and configured to permit the passage of free liquid aluminum but inhibit the passage of the dross' solids network. Means for supporting the receptacle is also provided. In addition, ram means for mechanically compacting the dross is provided. The ram means applies a compressive force on the dross towards the inclined sidewall of the receptacle to separate a substantial portion of the free aluminum from the dross and pass it through the passageway provided in the bottom of the receptacle. The ram means is provided with a ramming surface which faces the inclined sidewall surface of the receptacle. The ramming surface is inclined at an angle which is slightly less than that of the sidewall surface. As such, these surfaces cooperate during dross compaction to substantially inhibit upward displacement of the dross around the ram means. The cooperating surfaces also enhance the downward movement of the free molten aluminum in the dross towards and through the bottom passageway. In addition, a power source for reciprocally driving the ram into and out of the receptacle is provided as is means for collecting the molten aluminum which passes through the passageway provided in the bottom of the receptacle. Means for heating the receptacle and ram means to prevent or at least inhibit the dross from cooling while it is being charged into the receptacle and compressed is also included.

BRIEF DESCRIPTION OF THE DRAWINGS

In the description below, reference is made to the following drawings in which.

DETAILED DESCRIPTION OF THE PREFERRED EMBODIMENTS

Figure 1:
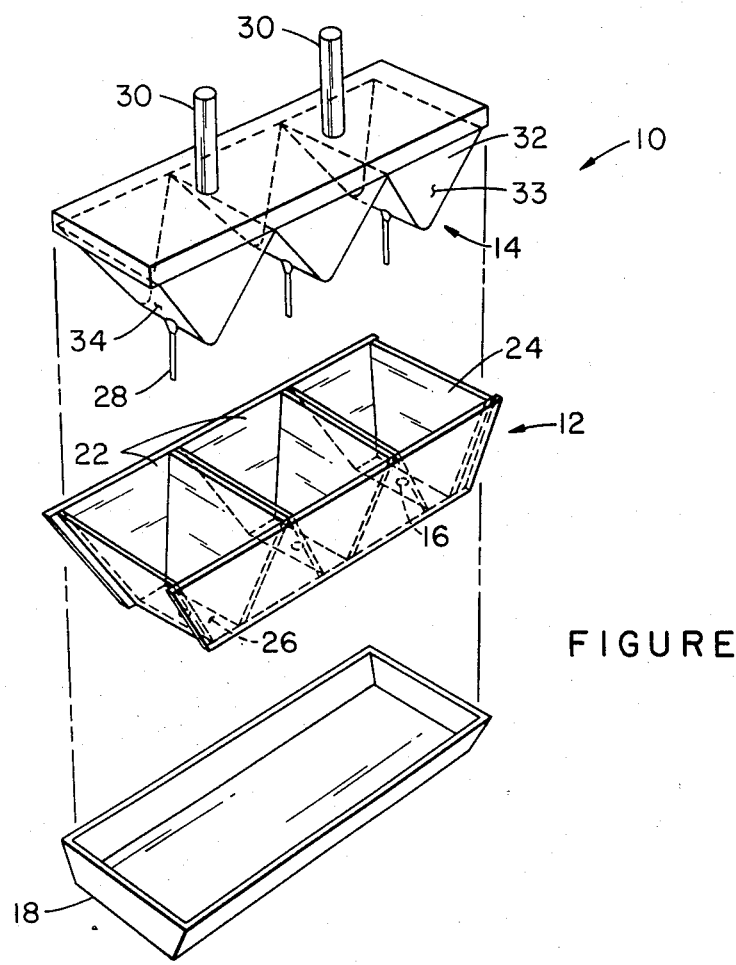
FIG. 1 provides an exploded perspective view of an embodiment of the present invention wherein an assembly of ram means, dross receptacle and collecting pan is illustrated.
Figure 2:
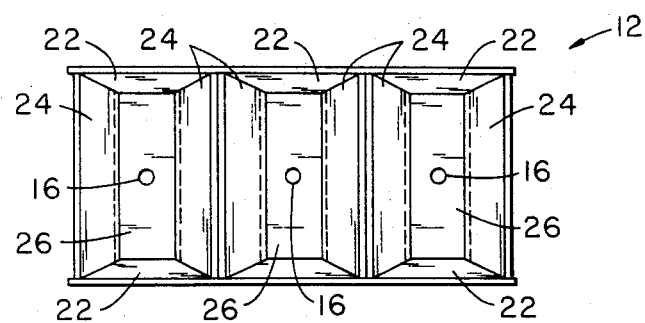
FIG. 2 is a top plan view of the receptacle illustrated in FIG. 1.
Figure 3:
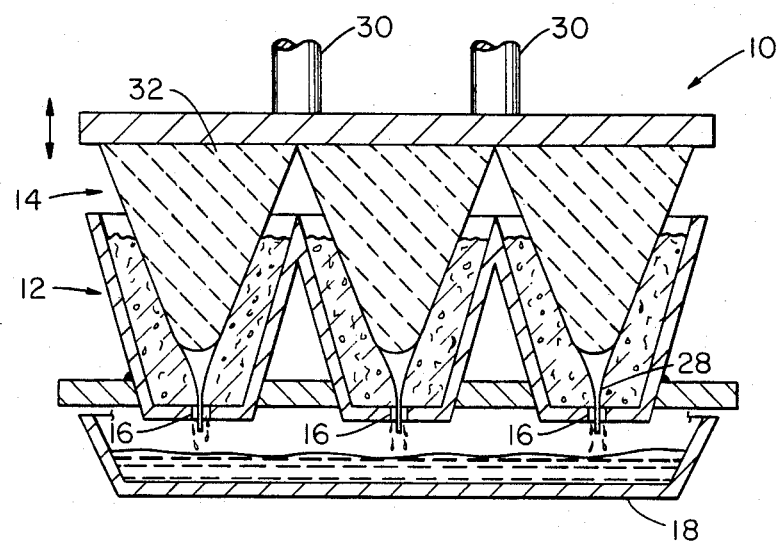
FIG. 3 is a cross-sectional side view of the embodiment disclosed in FIGS. 1 and 2 illustrating compaction of the dross in the receptacle troughs and collection of free aluminum metal in the collecting pan which has been separated from the dross and passed through the hole provided in each trough bottom.

FIGS. 1 through 4 illustrate a preferred embodiment of the present invention. FIG. 1 provides an exploded perspective view of three main components comprising a press 10 of the present invention. Numeral 12 generally refers to a receptacle into which dross is charged. Numeral 14 generally refers to a ram means which descends into receptacle 12 after it has been charged with dross for purposes of applying compressive forces on the dross to squeeze or separate the free aluminum therefrom and pass it through bottom passageways 16 provided in the bottom of receptacle 12. In a preferred embodiment, a series of successive strokes by the ram means is applied to the dross to maximize metal recovery. A collecting pan 18 is also illustrated for collecting free molten aluminum that has passed through bottom passageways 16.

Press 10 is preferably located near or directly adjacent a melting furnace (not shown). This facilitates quick transfer of dross from the furnace to the press. Quick transfer serves to prevent the dross from cooling off and undergoing further oxidation. Also not shown are means for skimming the dross from the surface of the molten aluminum in the melting furnace and means for charging the dross into receptacle 12 of press 10. Those skilled in the relevant art will be aware of numerous means which are suitable for such skimming and charging.

Returning to FIGS. 1 through 3, it will be seen that receptacle 12 is comprised of three semi-wedge shaped troughs 20, each of which is provided with two substantially inclined end walls 22 and two inclined sidewalls 24. Inclined walls 22 and 24 converge downwardly towards a bottom 26 provided in each trough. Each bottom 26 defines a previously mentioned bottom hole or slot 16.

As dross is charged into each of the troughs, some of the free aluminum present in the dross will immediately (i.e. without the application of any compressive forces) separate from the dross and pass through bottom hole 16 into pan 18. Bottom slots or holes 16 are believed to facilitate this initial separation since they are sized and configured to permit the passage of free aluminum but inhibit the passage of the dross' sponge-like solids network which contains aluminum oxide and various other oxides, nitrates and carbides. As depicted in FIGS. 1 through 4, holes 16 are round with a diameter of approximately 3 inches. However, the diameter of the holes may range from 2 to 4 inches. Slots having similar cross-sectional area may also be used; however, round holes are preferred since they facilitate easy penetration by a marl punch 28. Penetration provided by marl punch 28 prevents or keeps the holes from clogging or freezing up with dross impurities which may occur from time to time (more on this, infra).

After troughs 20 are adequately charged with dross, ram means 14 is immediately lowered into the troughs for purposes of applying pressure on the dross. Such pressure creates shear forces within the dross which cause the free aluminum contained in the dross to coalesce and pass through bottom hole 16 into collecting pan 18. Lowering of the ram means is done immediately after charging to minimize further oxidation and cooling of the dross. If a series of compressive strokes, possibly 3 to 10, is to be applied to the dross for purposes of maximizing metal recovery, each ram head should again be lowered immediately after each stroke to minimize dross oxidation. Ram means 14 is driven by a power source (not shown) which is attached to shafts 30 of ram means 14 for reciprocally driving the ram into and out of the troughs.

As depicted in FIGS. 1 through 4, ram means 14 is provided with three semi-wedge ram heads 32, each of which has two ramming end wall surfaces 33 and two ramming sidewall surfaces 34. These surfaces face their respective trough inclined end wall and sidewall surfaces 22 and 24 when the ram heads are lowered into the troughs. As perhaps best illustrated in FIG. 3, each of these ramming surfaces is inclined at an angle which is slightly less (approximately 10°) than that of its opposing trough surface. The slightly differing angle of inclination enables the opposing surface to cooperate during compression to inhibit or prevent upward displacement of dross around the ram head. Such also causes the free aluminum in the dross to move downwardly towards the hole provided in each trough's bottom. In addition, it is believed that the differing angle also maximizes shear forces within the dross mass while simultaneously permitting dross compression or compaction to proceed at optimum speed. While a differing angle of inclination is not essential to the present process invention, preferred results are obtainable with differing angles of inclination ranging from 0° to 20°. Preferred results are also believed to be possible by providing the ram heads with cast-in grooves (not shown) which should further increase shear forces and thereby enhance the flow of free aluminum metal to the bottom of the trough. In addition, each ram head is sized and configured to closely fit within the top opening of each trough. This serves to further minimmize metal loss resulting from oxidation. It also tends to prevent or inhibit the hot dross from cooling during compaction.

Returning to the drawings, it will be seen that the previously mentioned marl punch 28 is integrally attached to the end of each ram head 32. Marl punch 28 should have a length which enables it to pierce hole 16 early in the ram head's downward stroke. Such early piercing will prevent bottom holes 16 from clogging with the dross' solids network during the compression step. If such clogging is not prevented, the dross in each trough might flow upwardly and spill out of each trough as the ram heads are lowered.

After the dross has been fully compacted (i.e., usually after a series of compressive strokes by ram heads 32 on the dross), the free aluminum metal which has collected in collecting pan 18 can be immediately recycled to the melting furnace or cooled in a convenient form for later use as pig. The compacted dross material remianing in the troughs can be either discarded or subjected to further treatments for recovering any remaining aluminum contained therein. For example, the metal-rich fractions, which are generally the larger dross frictions, could be charged into a vortex melter such as that disclosed in U.S. Pat. No. 4,286,985 to van Linden et al. Recovery of any remaining aluminum from the dross could then be pursued with the process described in U.S. Pat. No. 4,191,559 to van Linden et al.

Figure 4:
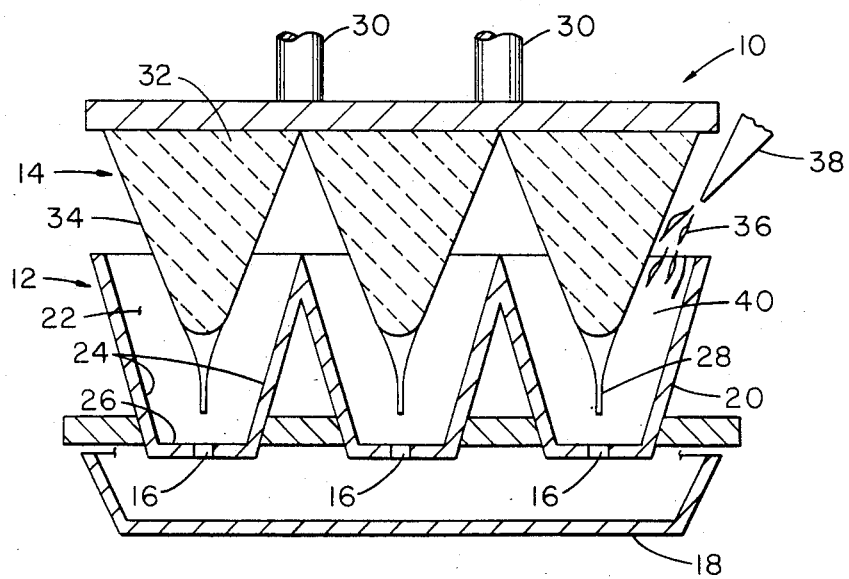
FIG. 4 is a cross-sectional side view of the embodiment of FIGS. 1 through 3 wherein means for heating the ram heads and troughs prior to the step of charging dross into the troughs is illustrated.

In FIG. 4, it will be seen that the ram heads and empty troughs are being heated by a flame 36 of torch means 38. The flame is directed into a gap 40 which is created between the surface of each ram head and trough. Gap 40 is created by partially lowering the ram heads into the troughs to a point where flame 36 can heat both the ram head and the empty trough. In accordance with the present invention, the ram heads and troughs are heated to a temperature approximating that of the hot dross in the furnace. When this temperature is reached, the ram heads are raised and the torches are withdrawn to enable immediate charging of the hot dross from the furnace into the empty troughs. Immediate charging is important, not only as previously mentioned to prevent the hot dross from undergoing further oxidation, but also to complete such charging before the ram heads and troughs have a chance to significantly cool. After the troughs are charged, the ram heads are, as previously mentioned, immediately lowered, again as previously mentioned, to minimize oxidation losses.

The aforementioned heating step is directed to an important aspect of the present process invention which involves not only maintaining the furnace temperature of the hot dross during skimming and charging, but also during the step of mechanically compacting the dross. Hot compacting of dross has been found to make it possible to separate out approximately 15% more aluminum than that which is possible with cooled dross or dross whose temperature has not been conciously maintained. Applicants are not certain as to why their hot compacting produces high yields; however, they believe that it may be attributable to enhanced forced coalescence of free aluminum in the dross. It's also thought that such enhanced forced coalescence might be attributable to dross fluidity or viscosity which is maintained by maintaining dross temperature. Hot compacting, in accordance with the present process invention, can be further enhanced by insulating or somewhat designing the trough and ram heads to maintain heat. Applicants have found that ram heads made of heavy-duty cast refractory will provide good results. Alternatively, heating coils could be embedded in the ram heads and troughs. Whatever the means, those apparent to one skilled in the relevant art are considered to be within the purview of the present invention.

While the invention has been described in terms of preferred embodiments, the claims appended hereto are intended to encompass all embodiments which fall within the spirit of the invention.

Having thus described the invention and certain embodiments thereof, what is claimed is:

1. A method for the recovery of free aluminum metal from hot aluminum dross which forms on the surface of molten aluminum during aluminum melting operations, said dross containing free aluminum metal and a solids network, said method comprising the steps of:
    (a) charging the hot dross from the aluminum melting operation into a receptacle having at least one inclined sidewall and at least one passageway extending through the bottom of the receptacle, said bottom passageway being sized and configured to permit the passage of free aluminum and inhibit the passage of said solids network;
    (b) mechanically compacting the dross with a heated ram, said compacting applying a compressive force on the dross towards the inclined sidewall such that a substantial portion of the free aluminum separates from the dross and passes through the bottom passageway;
    (c) maintaining the temperature of the hot dross during its collection in the receptacle and subsequent mechanical compaction so as to enhance the removal of free aluminum therefrom; and
    (d) collecting the free aluminum metal which passes through the bottom passageway.

2. The method of claim 1 wherein the dross is mechanically compacted by applying a series of successive strokes on the dross towards the inclined sidewall.

3. The method of claim 2 wherein 3 to 10 strokes are applied.

4. The method of claim 1 wherein the mechanical compaction is provided by the downward stroke of a ram having a marl punch, said marl punch extending into the bottom passageway of the receptacle early in the downward stroke of the ram so as to prevent the bottom passageway from clogging with said solids network.

5. The method of claim 1 wherein the receptacle is provided with a top opening through which said dross is charged.

6. The method of claim 5 wherein the mechanical compaction of the dross is provided by a reciprocally moving ram which is sized and configured to closely fit within the top opening to minimize metal loss resulting from oxidation, the ram further having a ramming surface facing the inclined sidewall surface of the receptacle, said ramming surface being inclined at an angle slightly less than that of the sidewall surface such that the facing surfaces cooperate during dross compaction to direct movement of the free aluminum in the dross downwardly towards the bottom passageway, thereby enhancing removal of the free aluminum from the dross.

7. The method of claim 6 wherein the ram is provided with a plurality of ramming surfaces and the receptacle is provided with a plurality of inclined faces.

8. The method of claim 6 wherein the surfaces are semi-spherically shaped.

9. The method of claim 6 wherein the surfaces are substantially conical in shape.

10. The method of claim 6 wherein the surface of the receptacle and ram are, respectively, concave and convex in shape.

11. The method of claim 1 further comprising cooling the compacted dross after said compacting, said cooling minimizing further oxidation of any free aluminum contained within the compacted dross.

12. A method for the recovery of free aluminum metal from hot aluminum dross which forms on the surface of molten aluminum during aluminum melting operations, said dross containing free aluminum metal and a solids network, said method comprising the steps of:
    (a) heating a ram means and a receptacle to a temperature approximating that of the hot dross to inhibit cooling of the dross during the subsequent charging and mechanical compaction steps, said receptacle having at least one inclined sidewall and at least one passageway extending through the bottom of the receptacle, said bottom passageway being sized and configured to permit the passage of free aluminum and inhibit the passage of said solids network;
    (b) charging the hot dross from the aluminum melting operation into the heated receptacle;
    (c) mechanically compacting the dross with the heated ram means by applying a compressive force on the dross towards the inclined sidewall such that a substantial portion of the free aluminum separates from the dross and passes through the bottom passageway; and
    (d) collecting the free aluminum metal which passes through the bottom passageway.

13. The method of claim 12 wherein the ram means and receptacle are heated by directing a flame into a gap existing between the ramming surface and the receptacle sidewall surface when the ram means is partially inserted into the receptacle.

14. The method of claim 12 wherein the ram means and receptacle are heated by embedding heating coils therein.

15. A method for the recovery of free aluminum metal from hot aluminum dross which forms on the surface of molten aluminum during aluminum melting operations, said dross containing free aluminum metal and a solids network, said method comprising the steps of:
    (a) charging the hot dross from the aluminum melting operation into a receptacle having at least one inclined sidewall and at least one passageway extending through the bottom of the receptacle, said bottom passageway being sized and configured to permit the passage of free aluminum and inhibit the passage of said solids network;
    (b) mechanically compacting the dross by applying a compressive force on the dross towards the inclined sidewall such that a substantial portion of the free aluminum separates from the dross and passes through the bottom passage, said compacting being provided by an upward stroke of the receptacle towards a fixed ram;
    (c) maintaining the temperature of the hot dross during its collection in the receptacle and subsequent mechanical compaction so as to enhance the removal of free aluminum therefrom; and
    (d) collecting the free aluminum metal which passes through the bottom passageway.

16. A method for the recovery of free aluminum metal from hot aluminum dross which forms on the surface of molten aluminum during aluminum melting operations, said dross containing free aluminum metal and a solids network, said method comprising the steps of:
    (a) charging the hot dross from the aluminum melting operation into a receptacle having at least one inclined sidewall and at least one passageway extending through the bottom of the receptacle, said bottom passageway being sized and configured to permit the passage of free aluminum and inhibit the passage of said solids network;
    (b) mechanically compacting the dross by applying a compressive force on the dross towards the inclined sidewall such that a substantial portion of the free aluminum separates from the dross and passes through the bottom passageway;
    (c) maintaining the temperature of the hot dross during its collection in the receptacle and subsequent mechanical compaction so as to enhance the removal of free aluminum therefrom;
    (d) collecting the free aluminum metal which passes through the bottom passageway; and
    (e) removing the compacted dross from the receptacle and then quickly cooling said compacted dross.

* * * * *